(12) United States Patent
Eilertsen

(10) Patent No.: US 7,044,846 B2
(45) Date of Patent: May 16, 2006

(54) APPARATUS AND METHOD FOR TRIMMING OF FISH FILLETS

(76) Inventor: Stein Grov Eilertsen, Vadmyrveien 39, N-5172 Loddefjord (NO)

( * ) Notice: Subject to any disclaimer, the term of this patent is extended or adjusted under 35 U.S.C. 154(b) by 0 days.

(21) Appl. No.: 10/494,117

(22) PCT Filed: Nov. 1, 2002

(86) PCT No.: PCT/NO02/00402

§ 371 (c)(1),
(2), (4) Date: Jun. 28, 2004

(87) PCT Pub. No.: WO03/037090

PCT Pub. Date: May 8, 2003

(65) Prior Publication Data

US 2005/0014461 A1    Jan. 20, 2005

Related U.S. Application Data

(60) Provisional application No. 60/330,841, filed on Nov. 1, 2001.

(51) Int. Cl.
*A22C 25/16* (2006.01)
(52) U.S. Cl. ..................................................... 452/161
(58) Field of Classification Search ................. 452/161
See application file for complete search history.

(56) References Cited

U.S. PATENT DOCUMENTS

| | | | | |
|---|---|---|---|---|
| 5,352,153 A | * | 10/1994 | Burch et al. | 452/157 |
| 5,492,502 A | * | 2/1996 | Hjorth | 452/170 |
| 5,591,076 A | * | 1/1997 | Evers et al. | 452/157 |
| 6,148,030 A | * | 11/2000 | Katata et al. | 375/240.1 |
| 6,164,174 A | * | 12/2000 | Sigurdsson et al. | 83/13 |
| 6,604,991 B1 | * | 8/2003 | Jurs et al. | 452/150 |
| 6,649,412 B1 | * | 11/2003 | Borggaard et al. | 436/20 |

* cited by examiner

*Primary Examiner*—Thomas Price
(74) *Attorney, Agent, or Firm*—Francis C. Hand; Carella, Byrne, Bain etal.

(57) ABSTRACT

The automatic fillet-trimming machine comprises a first conveyor belt that is capable of registering the weight of the individual fillets, one or more computer-controlled cameras or other imaging means that identifies and localizes the undesired portions of a fish fillet to be removed, a height-measuring apparatus the registers the thickness of the fillets, a second conveyor belt that comprises suction means for securely holding the fillets, and which transports the fillets to a plurality of computer-controlled cutting devices, the movement of which is directed according to coordinates received from the imaging means, and means for weighing and removing waste products.

14 Claims, 10 Drawing Sheets

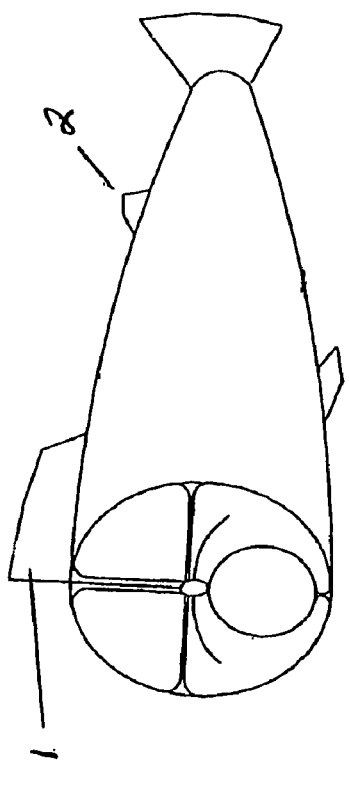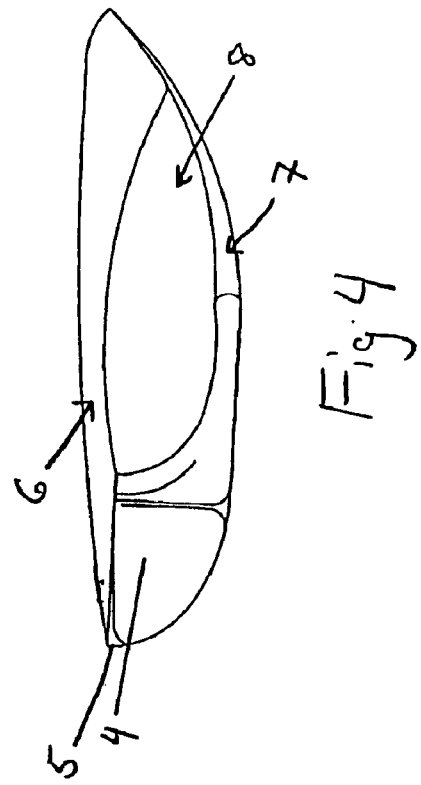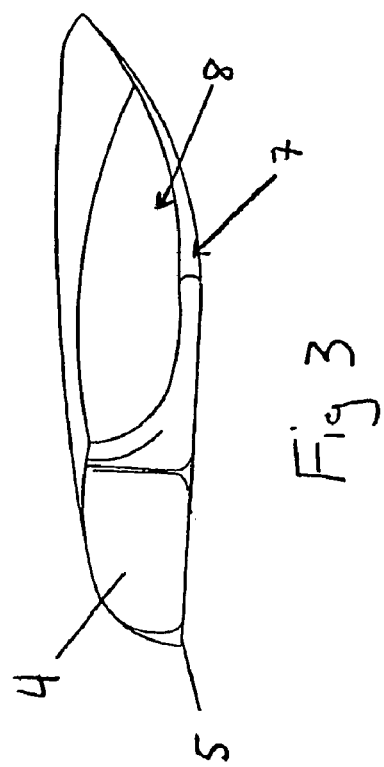

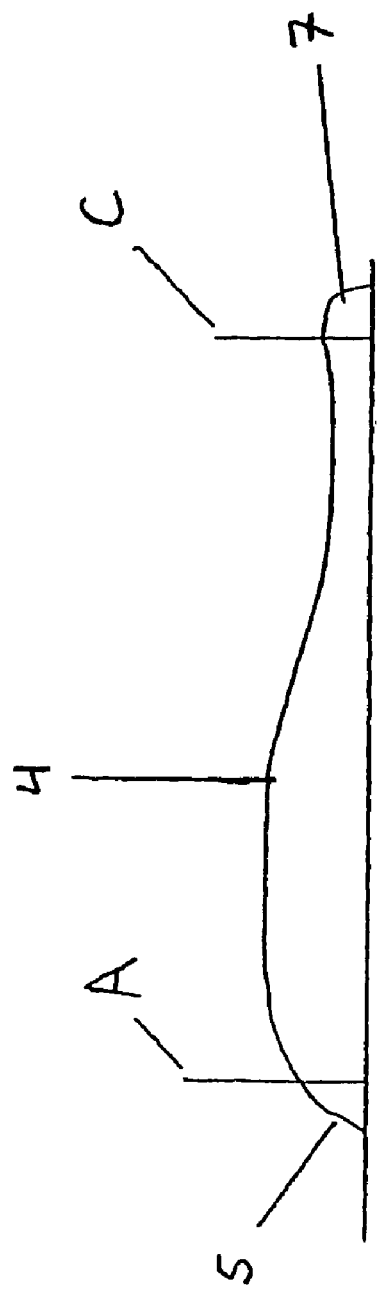
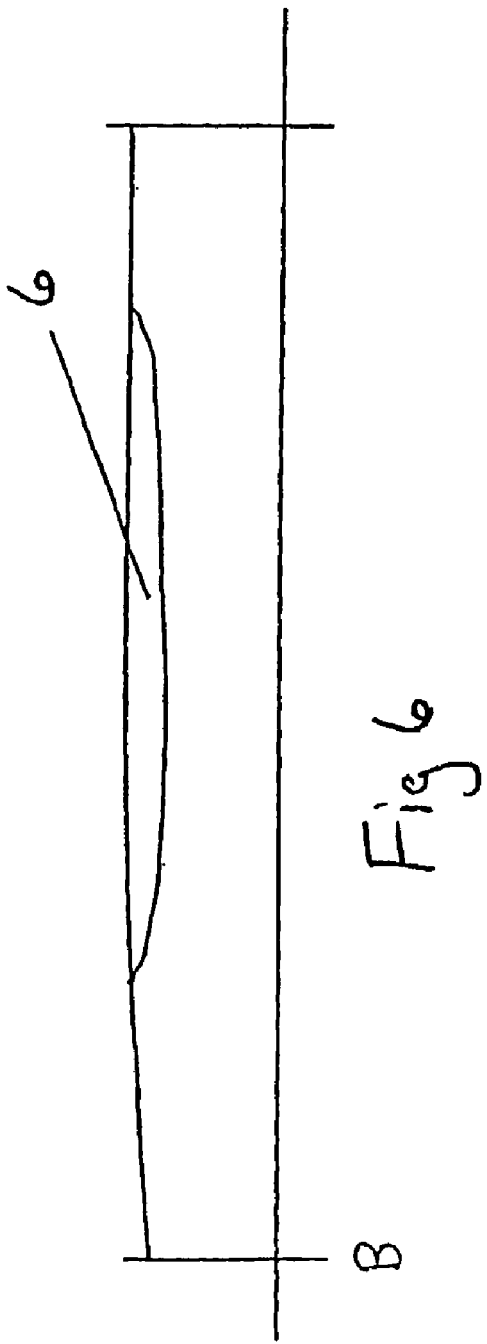

APPARATUS AND METHOD FOR TRIMMING OF FISH FILLETS

This application claims the benefit of Provisional application Ser. No. 60/330,841, filed Nov. 1, 2001.

BACKGROUND OF THE INVENTION

The present invention relates to a machine and method for the automated trimming of fish fillets, including the removal of undesired tissue, for example fat tissue, discoloured tissue and any other undesired portions of a fish fillet.

Fish of the salmon family are characterized in that fatty tissues are quite distinct in relation to the meat. After the fish has been filleted, a significant amount of fatty tissues, discoloured tissues as well as fins and bones must be removed in order to achieve a quality product. During the initial filleting process, the head and backbone are removed from the fish, and the fish is divided into two fillets. U.S. Pat. No. 5,591,076 discloses an apparatus for the automatic processing of whole flatfish, wherein the dorsal and ventral fins are removed from the fish. This known device does not, however, provide for the trimming of fatty tissues from the resulting fillets.

Various attempts have been made at the automatic removal of fatty tissues from the surface of fish fillets. These attempts have heretofore provided unsatisfactory results. Consequently, the trimming of fish fillets continues to be done manually.

It is generally known to use a freezing drum to remove the skin and the fatty layer immediately beneath the skin from a fish fillet. In devices of this nature, the fillet is frozen skin-side down to the drum. A horizontal band knife is then used to slice the fillet, leaving the skin and the layer of fat attached to the drum. While this technique is adequate for removing the skin, it is unsatisfactory for the removal of layers of fat from the opposite side of the fillet. This is because the meat-side of the fillet does not have a flat profile, as is the case with the skin side. On the meat-side of the fillet, the dorsal edge and the ventral edge (which both contain layers of fat) are significantly lower than the thickest region of the fillet. The above-described technique would thus remove an excessive amount of meat from this thick portion.

The machine from U.S. Pat. No. 5,779,531 attempts to solve this problem by providing rollers that press the fillet against a conveying surface in order to flatten the fillet.

Again, this technique is intended primarily to remove the surface layer from the skin-side of the fillet, and is incapable of flattening the fillet to the degree necessary for the effective removal of fatty tissues from the meat-side.

It is known to use devices comprising brushes to remove fat from the meat-side of a fillet, however machines of this type produce a rough and unattractive surface.

SUMMARY OF THE INVENTION

The present invention provides for an apparatus and method that overcome the above-described problem of removing fatty tissues from the meat-side of a fish fillet, as well as providing for the completely automated trimming of fish fillets.

The automatic apparatus and method according to the invention comprises an operator interface, an order-handling system and the automatic fillet-trimming machine. The operator interface comprises an operator panel mounted on or near the trimming apparatus. The operator panel provides means whereby the operator can calibrate the apparatus, input and/or reset the various parameters of the system.

The order-handling system is a computer-controlled system in communication with the trimming apparatus whereby specific instructions from a customer can be registered and performed, such as the total weight or number of fillets to be trimmed, specific instructions regarding the type of trimming to be performed, etc.

The automatic fillet-trimming machine comprises a first conveyor belt that is capable of registering the weight of the individual fillets, one or more computer-controlled cameras or other imaging means that identifies and localizes the undesired portions of a fish fillet to be removed, a height-measuring apparatus the registers the thickness of the fillets, a second conveyor belt that comprises suction means for securely holding the fillets, and which transports the fillets to a plurality of computer-controlled cutting devices, the movement of which is directed according to coordinates received from the imaging means, and means for weighing and removing waste products.

The camera-system of the invention, which is generally known in the art, comprises a computer that calculates the coordinates of the various cuts to be performed based upon the color difference between the meat portions of the fillet and the fatty portions. The computer is connected to a control unit that controls a plurality of cutting devices that remove the undesired portions.

The cutting devices of the invention perform both vertical and horizontal cuts. The vertical cuts remove undesired portions from the trailing end of the fillet, as well as undesired tissue along the fillet's periphery. The horizontal cuts remove layers or patches of fat from the surface of the fillet. In order to perform the horizontal cuts, the apparatus comprises means for lifting the dorsal and ventral edges of the fillet to the height registered by the height-measuring apparatus in order to present a horizontal plane for cutting.

BRIEF DESCRIPTION OF THE DRAWINGS

The invention will be described in detail with reference to the following figures, wherein:

FIG. 1 is perspective view of a fish with the head removed.

FIG. 2 is a perspective view of the fish from FIG. 1, showing a cross-section of the muscle structure.

FIG. 3 is a perspective view of a fish fillet laying on a flat surface.

FIG. 4 is a perspective view of the fillet from FIG. 3, with the dorsal edge having been lifted in order to provide a horizontal surface ideal for cutting.

FIG. 5 is a vertical cross-section of a fillet in the dorsal-to-ventral direction, showing the location of fat regions and the dorsal edge cut A and ventral edge cut C.

FIG. 6 is a lengthwise, vertical cross-section of a fillet showing a fat region and the location of the tail cut B.

DETAILED DESCRIPTION

Figure 8:
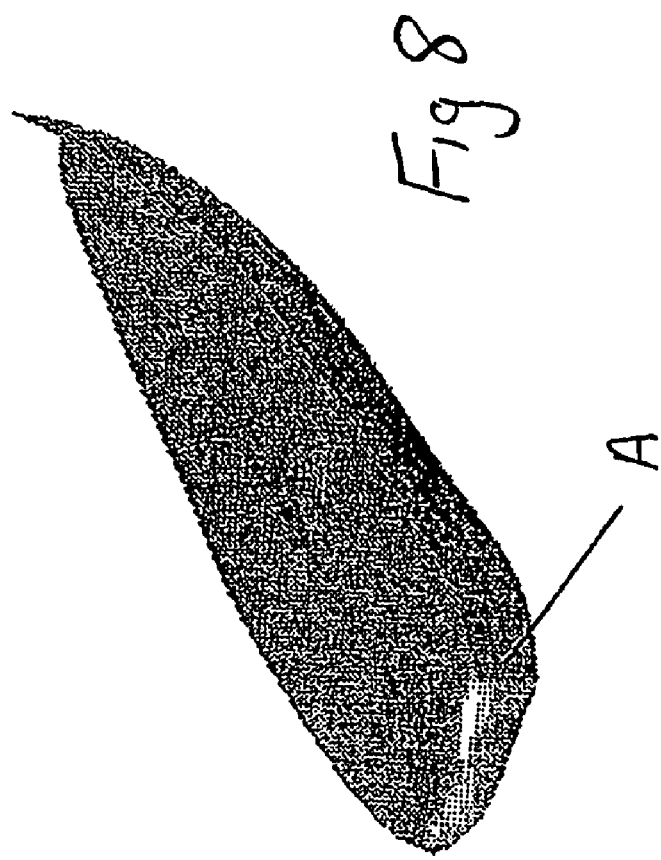
FIG. 8 is a perspective view of a fillet showing the location of the vertical cut A along the dorsal edge.
Figure 7:
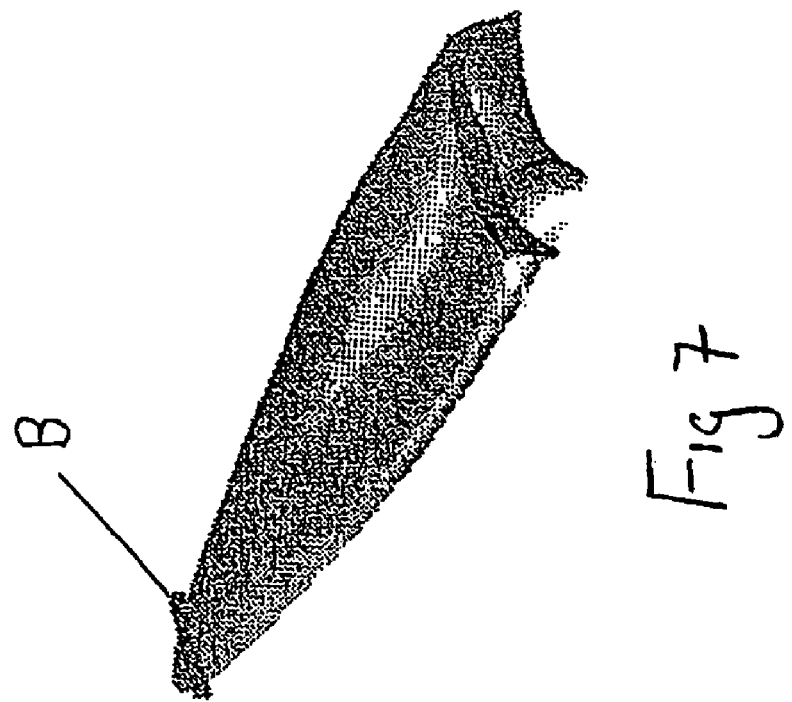
FIG. 7 is a perspective view of a fillet showing the location of the tail cut B.
Figure 10:
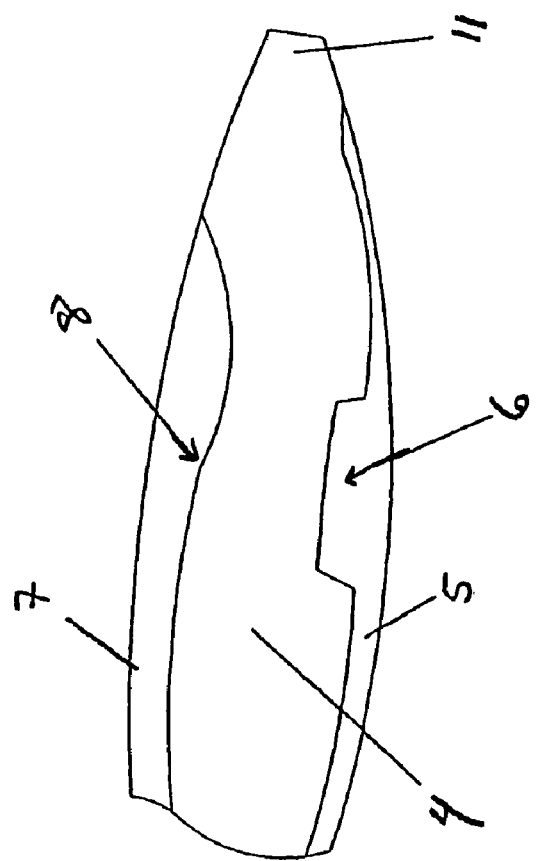
FIG. 10 is an overhead view of a fillet showing the regions of fat along the dorsal and ventral edges.
Figure 9:
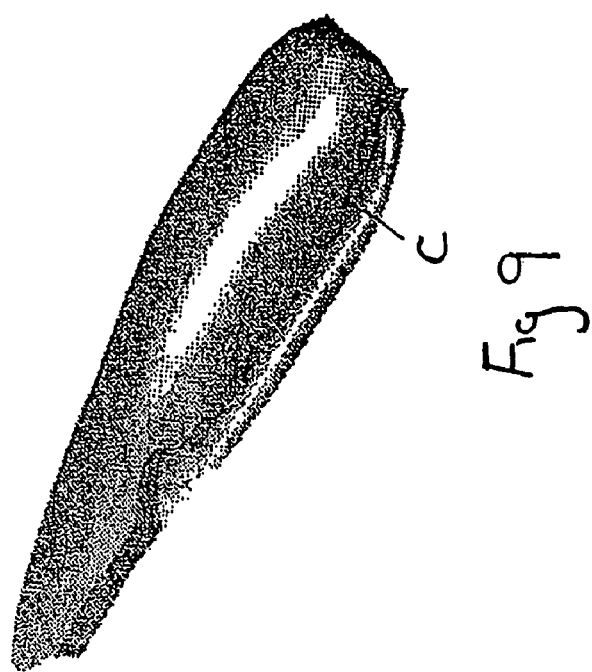
FIG. 9 is a perspective view of a fillet showing the location of the vertical cut C along the ventral edge.
Figure 11:
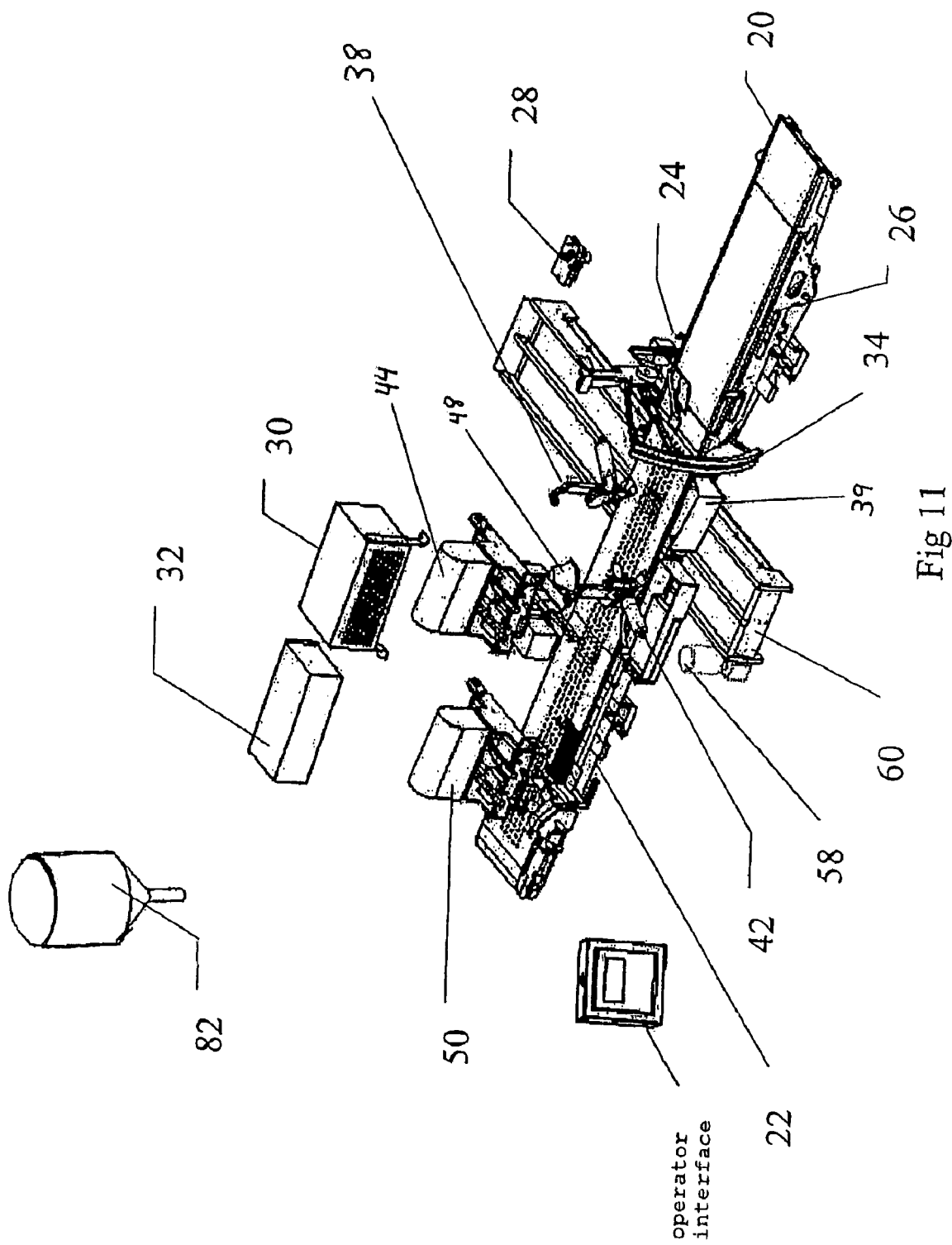
FIG. 11 is a perspective view of the apparatus according to the invention.

The automatic fillet-trimming machine according to the invention comprises two trimming lines, one for the right-hand and one for the left-hand fillets. FIG. 11 shows a machine for a right hand fillet. As shown in FIG. 11, each line of the automatic trimming machine according to the invention comprises two conveyors 20 and 22 for transport of fish fillet. A weighing means 26, which is located under conveyor 20, registers the weight of the fillet. After being weighed, the fillet is transported under a camera 28 or other appropriate imaging means. Camera 28 generates an image of the fillet and image-analysis software identifies the undesired tissue to be removed, and the camera computer program calculates the five individual cuts to be performed. The five cutting coordinates are then sent to a control unit 32, which controls a plurality of cutting mechanisms. An operator interface panel may be used to manually input or adjust the various parameters of the system as needed. A height measuring unit 24 registers the height of the fillet along its length and communicates this measurement to control unit 32. Height measuring unit 24 is preferably a photo cell device, however any appropriate-method for registering the thickness of the fillet, and communicating this measurement to control unit 32 would suffice.

In order to appreciate the function of the invention, FIGS. 1–10 show the body parts and other areas of interest of a fish of the salmon family, and its fillet, as well as the various cuts that are performed by the machine according to the invention. The body parts and other areas of interest include:

Dorsal Fin: 1
Fat fin: 2
Collarbone: 3
Thick dorsal meat region: 4
Dorsal edge fat strip: 5
Dorsal region surface-layer fat: 6
Ventral edge fat: 7
Ventral region surface-layer fat: 8
Anal region: 9
Ventral fin: 10
Tail section: 11

The machine according to the invention performs five cutting operations; three vertical cuts A, B, and C as identified in FIGS. 5–9, and two horizontal cuts D and E that remove surface tissues.

Figure 12:
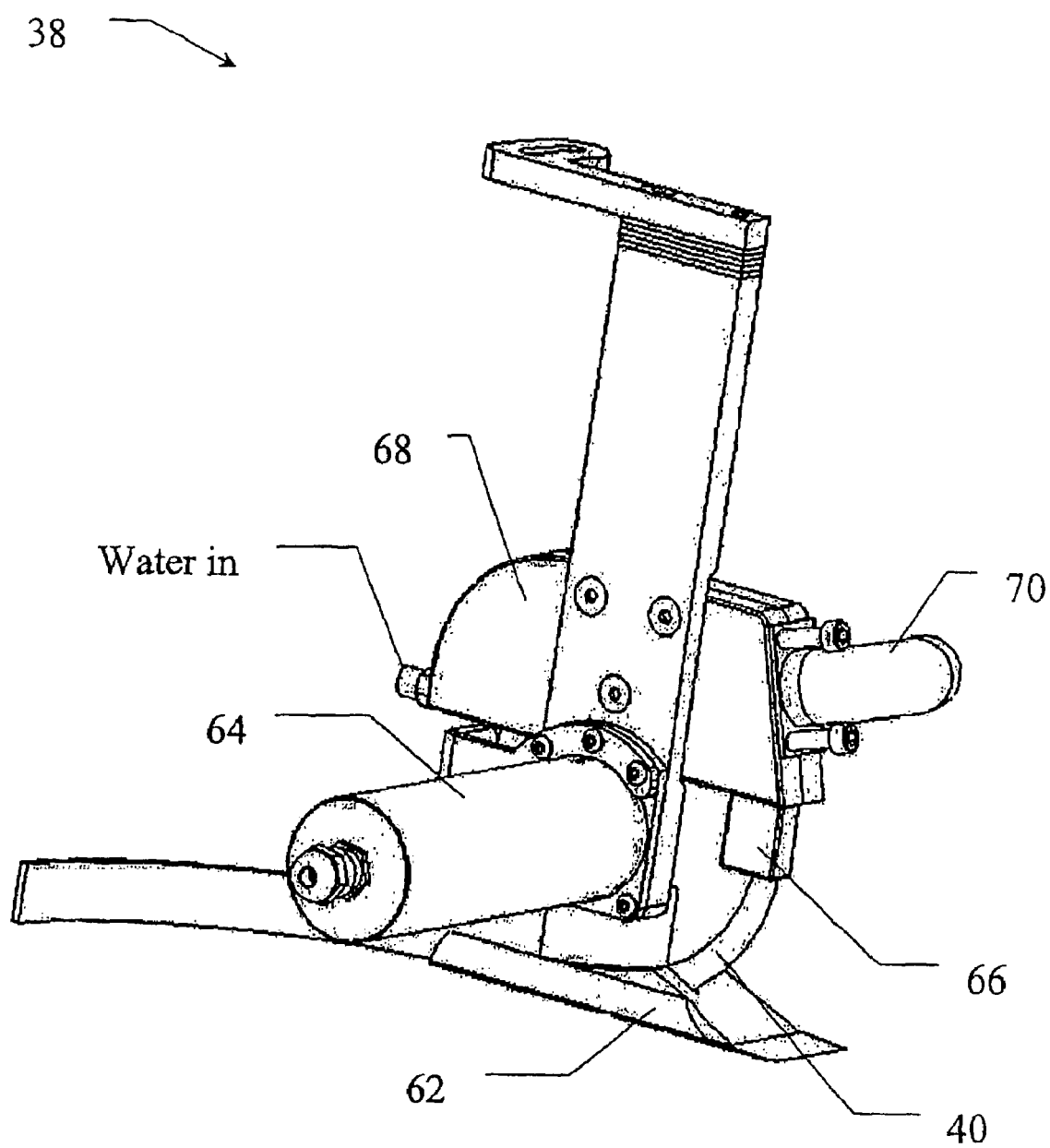
FIG. 12 is a perspective view of a cutting mechanism for performing vertical cuts along the dorsal edge.

Cut A: Dorsal edge cut: A first cutting mechanism 38 having a circular blade 40 as shown in FIG. 12 removes any remaining portions of the dorsal fin and fat fin that may have been left during the initial filleting process, as well as the dorsal edge fat strip.

Cut B: Tail cut: A second cutting mechanism 34, comprising a knife blade 36, removes the tail section from the fillet in a chopping motion.

Figure 14:
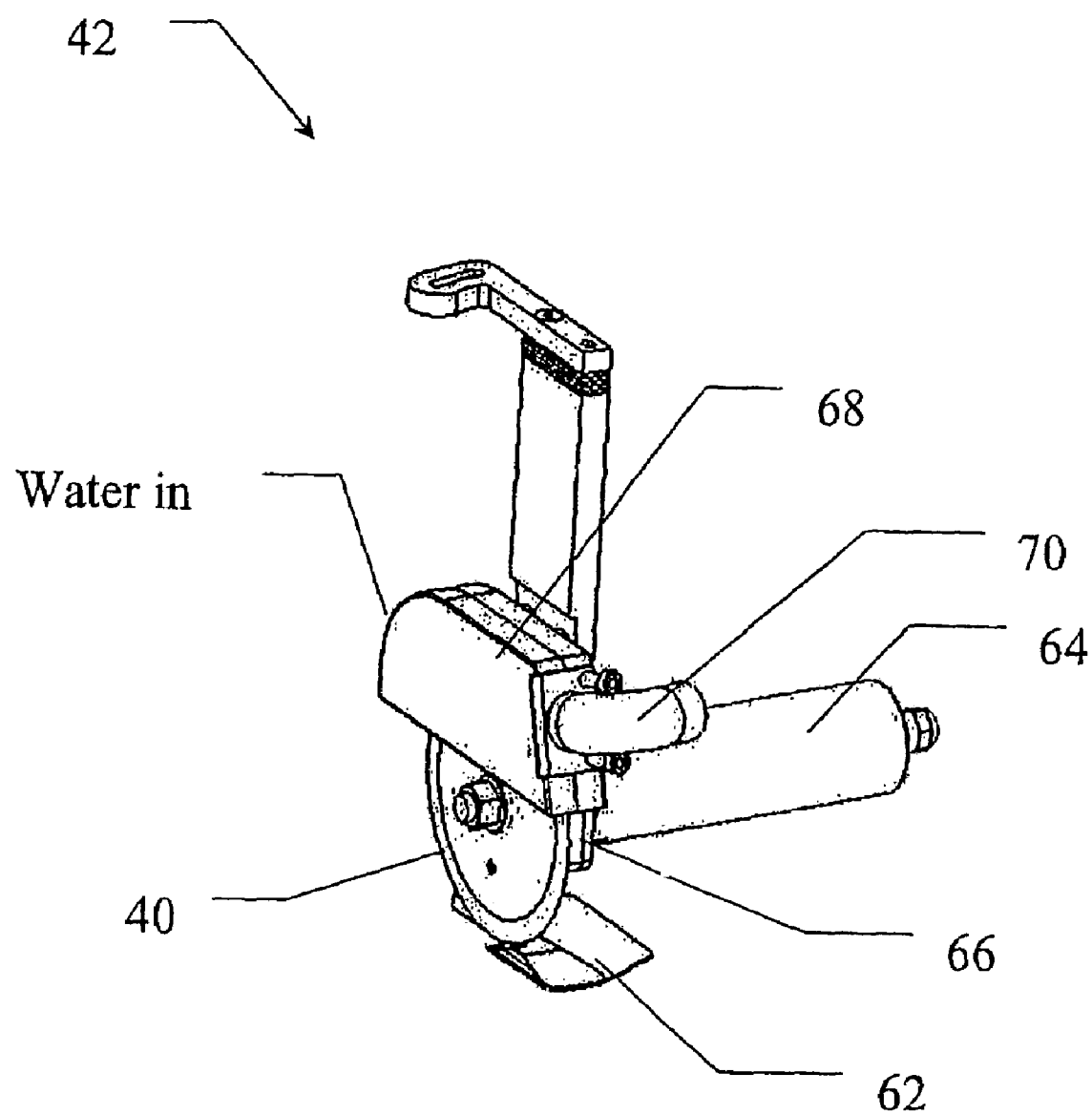
FIG. 14 is a perspective view of a cutting mechanism for performing vertical cuts along the ventral edge.

Cut C: Ventral edge cut: A third cutting mechanism 42 having a circular blade 40 as shown in FIG. 14 removes the ventral edge of the fillet, including the ventral fin muscle and anal region, and trims the area behind the anal region.

Figure 15:
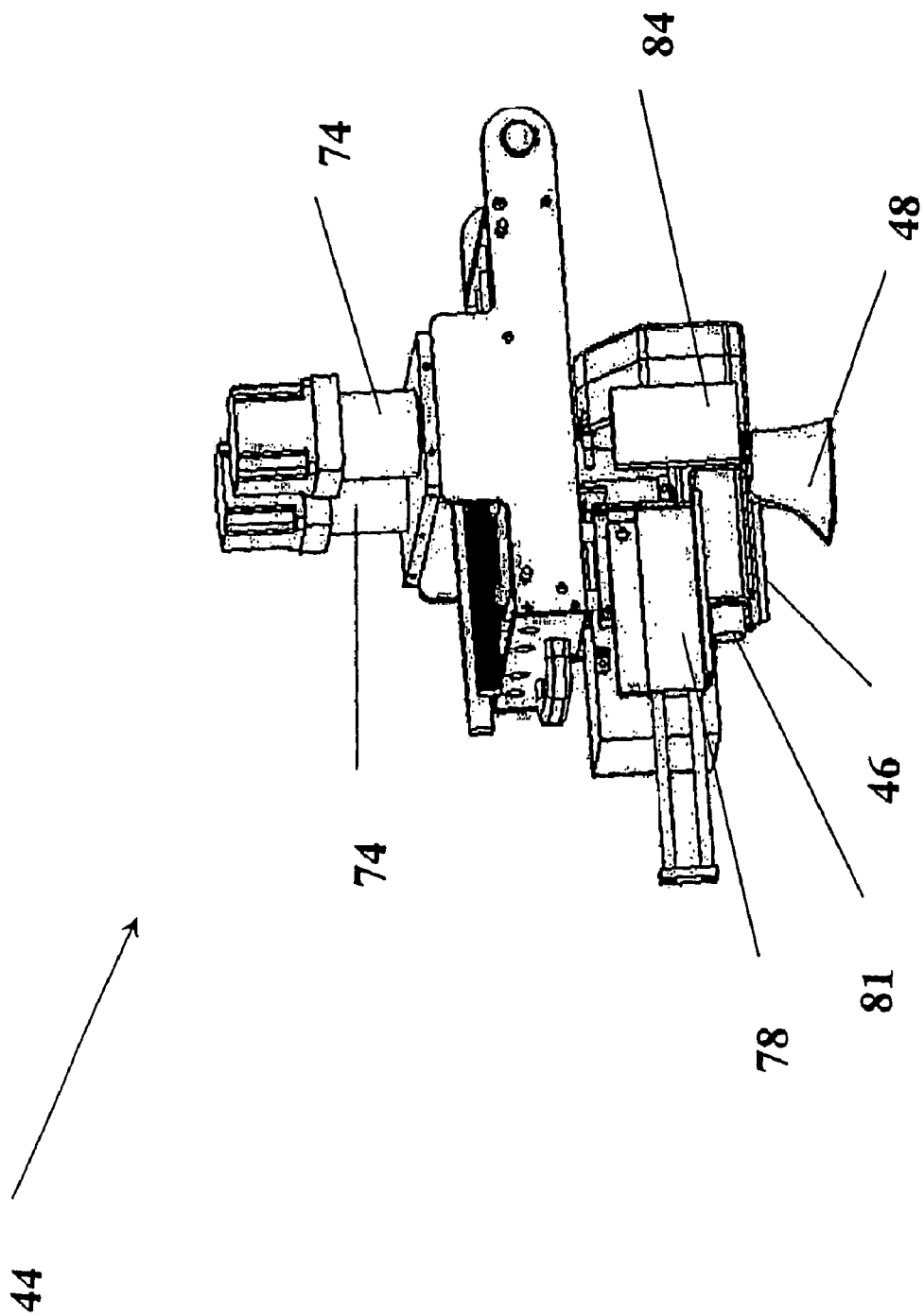
FIG. 15 is a perspective view of a cutting mechanism and lifting means for performing a horizontal cut along the dorsal edge of a fillet.

Cut D: Dorsal surface cut: A fourth cutting mechanism 44 having an oscillating blade 46 and a lifting plate 48 as shown in FIG. 15 removes the dorsal region surface-layer fat.

Figure 16:
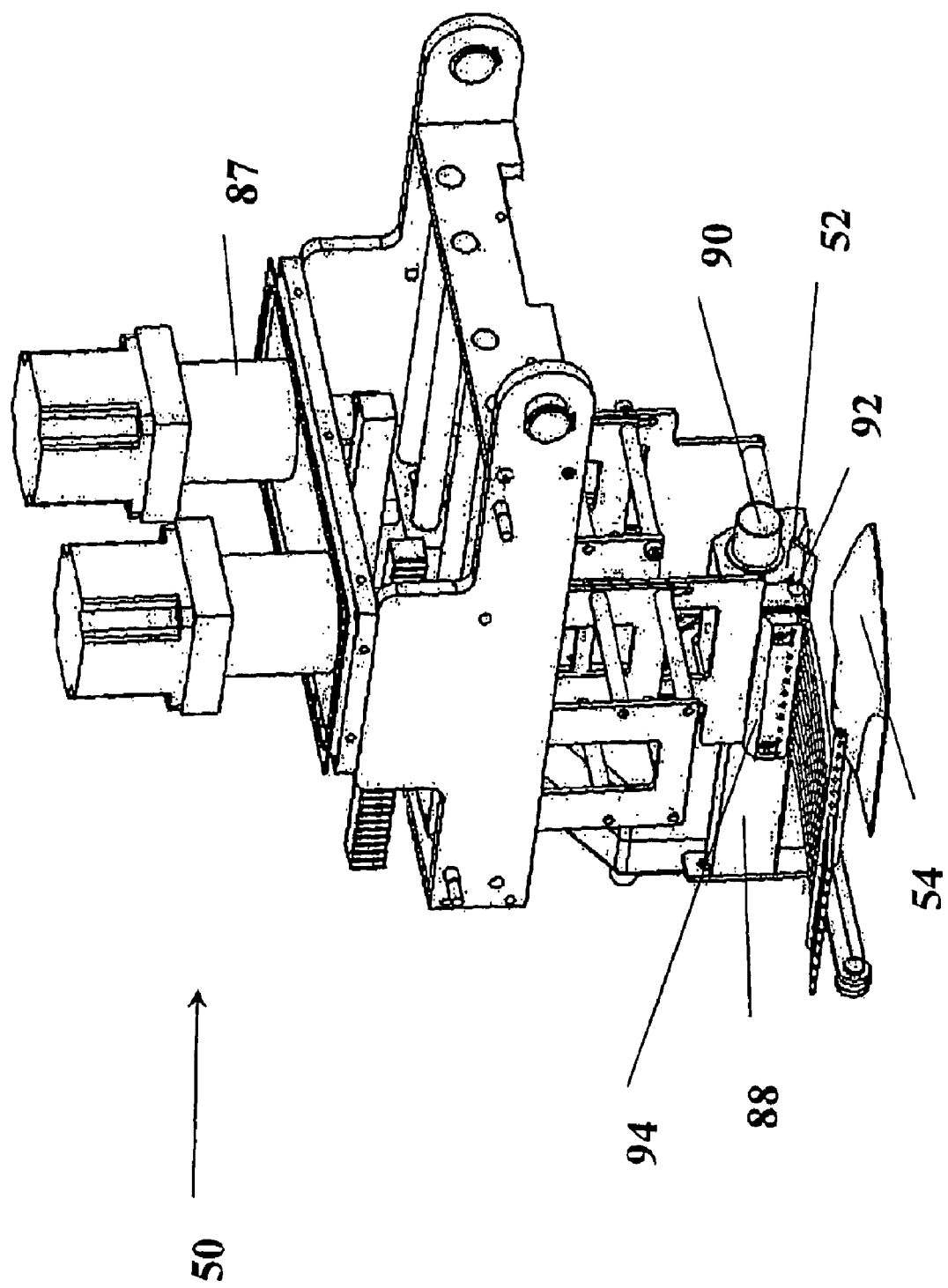
FIG. 16 is a perspective view of a cutting mechanism and lifting means for performing a horizontal cut along the ventral edge of a fillet.

Cut E: Ventral surface cut: A fifth cutting mechanism 50 having an oscillating blade 52 and a lifting means 54 as shown in FIG. 16 removes the ventral region surface-layer fat.

Mode of Operation

The machine operator selects the desired cuts to be performed from the machines database via an operator interface panel and filets are transported in to the machine.

The fillets are thereafter transported under the image camera 2 by conveyor 20, where the areas of undesired tissue are identified, the coordinates of these areas are registered and the necessary movement of the cutting mechanisms calculated.

After the camera computer has calculated the cuts to be performed, the fillet is transported by second conveyor 22 to a first cutting mechanism 38. Conveyor 22 is perforated, and a vacuum system applies suction to the fillets, holding them securely to the surface of the conveyor.

The horizontal position of cutting mechanism 38 is directed by control unit 32 according to the coordinates obtained from camera 28 and the speed of conveyor 22. As shown in FIG. 11, cutting mechanism 38 is positioned at an angle relative to the direction of conveyor 22. Cutting mechanism 38 cuts along the fillet's dorsal edge based upon the signal sent from the computer in camera 28 to control unit 32.

Cutting mechanism 38, as shown in FIG. 12, comprises a footplate 62 that raises the fillet into contact with circular blade 40. Circular blade 40 is driven by a motor 64, and is continuously sharpened by a sharpener 66 and cleaned by water jets integrated into a faceplate 68. The angle of cutting mechanism 38 causes the resulting waste product to lay on the footplate until the cutting mechanism returns to its 0 position, where the waste is then suctioned off by a vacuum apparatus (not shown) and into a hopper 82. The weight of the waste is calculated and stored in a database by a computer 30. Any waste tissue that becomes lodged in the blade is removed with the help of a vacuum pump (not shown) connected to a suction nozzle 70.

Figure 13:
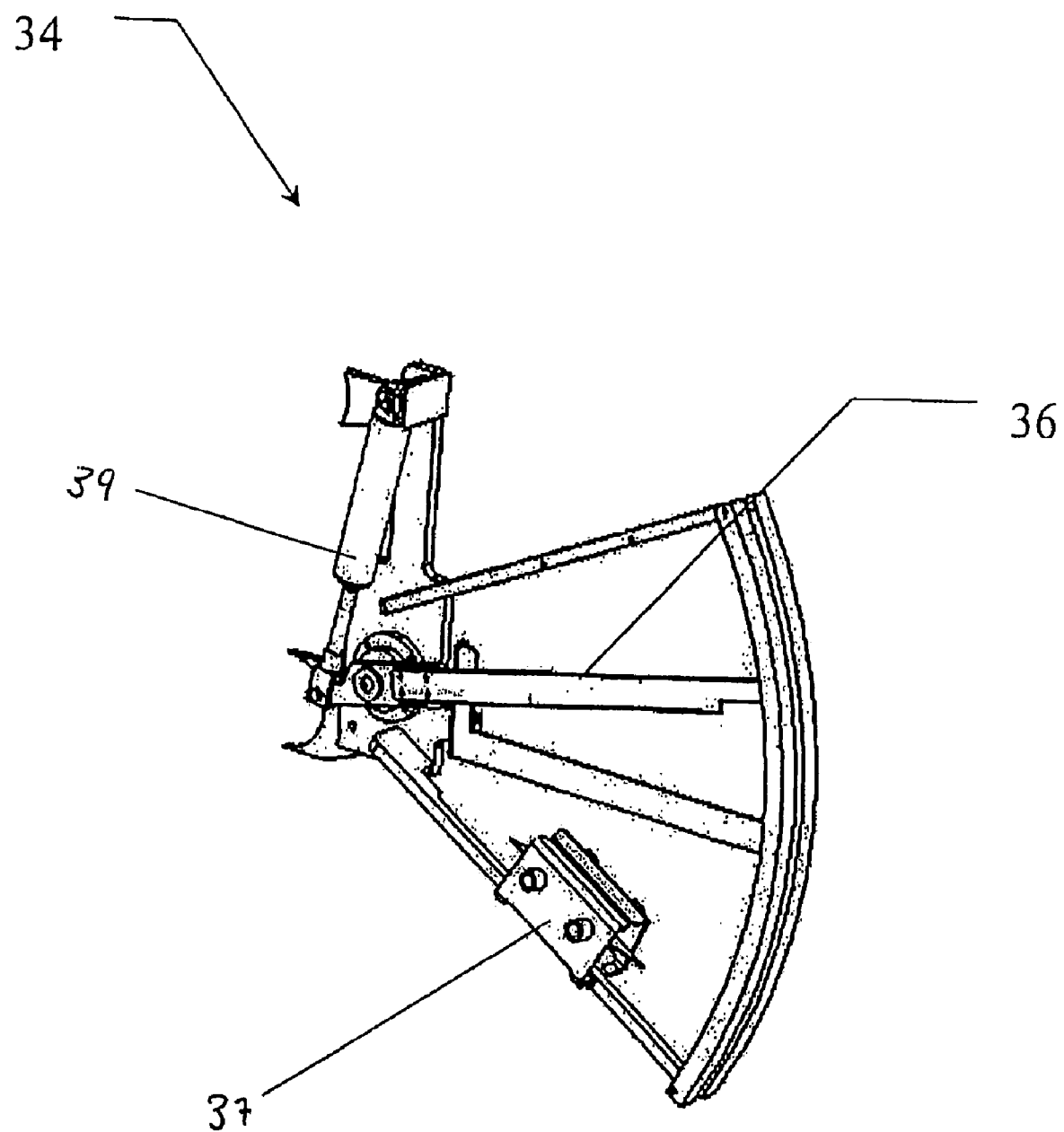
FIG. 13 is a perspective view of a cutting mechanism for performing the tail cut.

After the dorsal edge cut is performed, the fillet is moved forward until the tail section is in position at second cutting mechanism 34, which removes the tail section of the fillet is a chopping motion; As shown in FIG. 13, cutting mechanism 34 comprises a rigid blade 36, actuated by a piston 39. A sharpening device 37 is further provided. The waste from this third cut is removed by a compressed air nozzle (not shown), which forces the waste tissue into a container 39 where it is thereafter suctioned off into hopper 82. The weight of the tail is calculated by the computer and stored in the database.

The fillet is thereafter transported to third cutting mechanism 42 as shown in FIG. 14, which trims the ventral edge in essentially the same manner as the dorsal edge. When cutting mechanism 42 returns to its 0 position, the waste product falls into a container having a weighing means 58. When a predetermined weight is reached, the wasted is ejected by a compressed air nozzle onto and transported away by a waste conveyor 60.

After the ventral edge trimming, the fillet is transported to fourth cutting mechanism 44, depicted in FIG. 15. Cutting mechanism 44 comprises a horizontally oscillating blade 46, driven by a motor 74, that performs a horizontal cut in order to remove a surface layer of fat from the dorsal region. As shown in FIGS. 3 and 5, this fat region is lower than the thicker meat section in the dorsal region. The dorsal edge of the fillet must therefore be raised in order to present a flat surface to blade 46. Cutting mechanism 44 therefore further comprises a slideable, curved lifting plate 48. Control unit 32 causes lifting plate 48 to be pressed in towards the fillet. The edge of the fillet then rides up the curved surface of the lifting plate until the fillet's dorsal edge is raised to the same height as the thickest part of the fillet, as previously measured by height-measuring unit 24. A horizontal guide member 78, located above the fillet, presses down on the fillet in order to maintain the flat surface is well as to provided resistance when the fillet is cut by blade 46. At the moment of cutting, a vacuum pump connected to a nozzle 81, applies suction to the fat layer, drawing the layer of fat away from the fillet. The fat is suctioned away and stored in hopper 82. Cutting mechanism 44 further comprises water jets that clean blade 46, as well as a sharpening unit 84.

After the dorsal region surface-layer fat has been removed, the fillet is transported to fifth cutting mechanism 50, as shown in FIG. 16. Cutting mechanism 50 comprises a horizontally oscillating blade 52 driven by a motor 87. Cutting mechanism 50 performs a horizontal cut that removes the ventral region surface-layer fat. As is the case with the dorsal region, the ventral edge must be raised in order to present a flat surface for cutting. The ventral edge of the fillet is of a slightly different shape than the dorsal edge. Cutting mechanism 50 therefore comprises a lifting plate 54 and a horizontal guide member 88. The ventral edge of the fillet rides up on plate 54, and is caused to press upon guise member 88, thus presenting a horizontal surface for cutting to blade 52. Cutting mechanism 50 also comprises a vacuum nozzle 90, integrated water jets 92 and a sharpening unit 94 that perform similar functions as in cutting mechanism 44.

The finished fillet product is then transported to the end of the trimming machine and collected for packaging, etc.

The invention claimed is:

1. Apparatus for trimming of fish fillets comprising two complimentary trimming lines for trimming of undesired tissues from, respectively, the right-hand and left-hand fillets of a filleted fish, each of said trimming lines comprising:
   a. a first conveyor (20),
   b. a camera (28) mounted above conveyor (20) having image analysis software capable of identifying and mapping the coordinates of undesired tissues from a fish fillet and communicating said coordinates to a control unit (32) connected to a camera (28), said undesired, tissues being located along the dorsal edge, the ventral edge, the tail, the dorsal (meat side) surface and the ventral (meat side) surface of the fillet,
   c. a second conveyor (22) located immediately downstream of said first conveyor (29), and
   d. a plurality of cutting mechanisms sequentially located downstream from said camera (28), said cutting mechanisms being in connection with, and controlled by, a control unit (32), such that the cutting mechanisms follow the coordinates as recorded by said camera (28) and remove the undesired tissues.

2. The apparatus according to claim 1, further comprising a scale (26) mounted underneath said first conveyor (20), said scale being capable of recording the weight of the fillet and communicating the information to a computer (30), and a height-measuring device (24) capable of measuring the vertical thickness of the fillet along its length and communicating this information to said control unit (32).

3. The apparatus according to claim 2, whereby the plurality of cutting mechanisms comprise a. a first cutting mechanism (38) located downstream of camera (28), arranged to perform a vertical cut to remove undesired tissues from the dorsal edge of the fillet, said first cutting mechanism (38) having a vertically aligned circular blade (40) driven by a motor (64), said first cutting mechanism (38) having its horizontal position relative to the direction of conveyor (22) directed by signals sent from control unit (32) in such a manner as to follow the dorsal edge of the fillet such that undesired tissues are removed, b. a second cutting mechanism (34) located downstream of camera (28) and upstream of cutting mechanism (38), said second cutting mechanism (34) comprising a knife blade (36) arranged to remove the tail section of the fillet in a chopping motion, said cutting is mechanism (34) being directed by control unit (32) to perform the cut at the appropriate time as determined by the length of the fillet as recorded by camera (28), c. a third cutting mechanism (42) located downstream from, and on the opposite side of conveyor (22) as, cutting mechanism (38), said third cutting mechanism (42) being substantially identical to first cutting mechanism (38), and being directed by control unit (32) to perform a vertical cut along the ventral edge of the fillet according to coordinates as recorded by camera (28), d. a fourth cutting mechanism (44) located downstream from cutting mechanism (42) and on the same side of conveyor (22) as cutting mechanism (38), said fourth cutting mechanism comprising a horizontally oscillating blade (46) driven by a motor (74), said fourth cutting mechanism being directed by control unit (32) to perform a horizontal cut on the dorsal, meat-side surface of the fillet according to the coordinates of the undesired tissue on the dorsal surface as identified by camera (28) and the vertical thickness of the fillet as determined by the height-measuring device (24), said fourth cutting mechanism (44) further comprising a curved lifting plate (48) that is directed by control unit (32) to press into the fillet and raise the fillets dorsal edge to substantially the same height as the maximum thickness of the fillet as determined by height-measuring device (24), thereby causing the fillet to assume a substantially planar profile to oscillating blade (46), and e. a fifth cutting mechanism (50) located downstream from, and on the opposite side of conveyor (22) as, cutting mechanism (44), said fifth cutting mechanism (50) comprising a horizontally oscillating blade (52) driven by a motor (87), said fifth cutting mechanism being directed by control unit (32) to perform a horizontal cut on the ventral, meat-side surface of the fillet according to the coordinates of the undesired tissue on the ventral surface as identified by camera (28) and the vertical thickness of the fillet as determined by the height-measuring device (24), said fifth cutting mechanism (44) further comprising a lifting plate (54) over which the ventral edge of the fillet rides as it is conveyed by conveyor (22), the dimensions of lifting plate (54) being designed so as to raise the ventral edge of the fillet such that the fillet presents a substantially planar profile to oscillating blade (52).

4. The apparatus according to claim 3 whereby cutting mechanisms (38) and (42) further comprise a footplate (62) beneath their blades, said footplates (62) being designed so as to raise the fillet into contact with the blades, such blades being further arranged at an angle respective to the direction of conveyor (22).

5. The apparatus according to claim 4, whereby cutting devices (44) and (50) further comprise, respectively, horizontal guide members (78) and (88) both located above the fillet, such guide members being controlled so as to press down upon the meat-side surface of the fillet so as to assist in the fillet assuming a planar profile, and whereby cutting devices (44) and (50) further comprise, respectively, suction nozzles (81) and (90), said suction nozzles being connected to a vacuum system whereby suction is applied to the surface layer tissues at the moment the cut is performed.

6. The apparatus according to claim 5, whereby the cutting mechanisms of the invention have sharpening devices for the continuous sharpening of their respective blades, and water jets for the continuous cleaning of their respective blades.

7. The apparatus according to claim 6, whereby conveyor (22) is perforated and connected to a vacuum system for applying suction to the fillet to hold it securely to its surface.

8. The apparatus according to claim 7, further comprising means for the removal, collection and recording the weight of the undesired tissues that are removed.

9. The apparatus according to claim 8, whereby the waste-removal and recording means comprise a. a compressed air jet located in the vicinity of cutting mechanism (34) that blows the tail section into a container (39), said container being connected by a vacuum system that draws the tail section into to a hopper (82), b. software in computer (30) that calculates the weight of the tail section based upon the dimensions recorded by camera (28), c. a suction device located near the vicinity of cutting mechanism (38), whereby waste products, which are drawn by cutting device (38) towards the edge of conveyor (22) when cutting device (38) returns to its default position, are suctioned away to hopper (82), d. software in computer (30) that calculates the weight of the dorsal-edge waste based on the dimensions obtained from camera (28), e. a container located in the vicinity of cutting device (42) into which the ventral-edge waste products fall when cutting device (42) returns to its default position, said container comprising a scale (58) that weighs the waste products, sends this information to computer (30), and further comprising means for ejecting the waste products onto a waste-collection conveyor (60), f. vacuum means connected to nozzles (81) and (90) of cutting mechanisms (44) and (50), said vacuum means being designed to suction away waste products from the surface of the fillets into hopper (82), g. software in computer (30) that calculates the weight of the surface waste based on the dimensions obtained from camera (28), and h. nozzles (70) mounted on a blade covering plate (68) of cutting devices (38) and (42), said nozzles being connected to a vacuum system whereby waste products that become lodged in the covering plates are suctioned off to hopper (82).

10. The apparatus according to claim 9, further comprising an operator interface whereby an operator can manually input system parameters into the apparatus, as well as specific instructions regarding orders placed by customers relating to quantity, specific cuts to be performed and the like.

11. An apparatus as set forth in claim 1 wherein at least one of said cutting mechanisms (44) comprising a horizontally oscillating blade (46) driven by a motor (74), said one cutting mechanism containing means for adjusting the height of blade (46) respective to said conveyor (22) so as to cut away undesired tissues on the surface of the fillet, said one cutting mechanism (44) further comprising a curved lifting plate (48) that may be caused to press into the edge of the fillet and raise the edge of the fillets to substantially the same height as the maximum thickness of the fillet thereby causing the fillet to assume a substantially planar profile to oscillating blade (46).

12. An apparatus according to claim 11, further comprising a horizontal guide member (78) located above the fillet, such guide member members being controlled so as to press down upon the meat-side surface of the fillet so as to assist in the fillet assuming a planar profile.

13. An apparatus according to claim 12, further comprising a suction nozzle (81) said suction nozzle being connected to a vacuum system whereby suction is applied to the surface layer tissues at the moment the cut is performed.

14. An apparatus according to claim 13, further comprising a height measuring device located upstream of the cutting mechanism capable of recording the thickness of the fillet along its length and communicating this information to control unit (32), said control unit being capable of directing the height of oscillating blade (46) so as to follow the surface of the fillet, removing a predetermined thickness of tissues from the surface.

* * * * *